United States Patent
Kupke et al.

[11] Patent Number: 6,048,132
[45] Date of Patent: Apr. 11, 2000

[54] FILTER UNDERDRAIN WITH PREFABRICATED CELLS

[75] Inventors: John A. Kupke, Annapolis; Joseph A. Kupke, Germantown; John F. Pfeifer, Jr., Baltimore, all of Md.

[73] Assignee: Agency Environmental, Inc., Hanover, Md.

[21] Appl. No.: 09/122,801

[22] Filed: Jul. 27, 1998

[51] Int. Cl.[7] .................. E02B 11/00; B01D 24/12
[52] U.S. Cl. .................. 405/43; 405/45; 405/118; 405/119; 210/275; 210/291; 210/293; 52/169.5
[58] Field of Search .................. 405/36, 38, 43, 405/45, 118, 119; 52/11, 12, 169.5, 169.14; 210/291, 293, 275

[56] References Cited

U.S. PATENT DOCUMENTS

| | | | |
|---|---|---|---|
| 901,582 | 10/1908 | Austin | 405/43 |
| 3,239,061 | 3/1966 | Horning et al. | |
| 3,291,311 | 12/1966 | Pratt et al. | |
| 3,615,019 | 10/1971 | Early, Jr. | 210/293 |
| 3,625,365 | 12/1971 | Armstrong et al. | |
| 3,685,657 | 8/1972 | Hunter et al. | |
| 3,817,378 | 6/1974 | Ross | |
| 3,956,134 | 5/1976 | Sturgill | 210/293 X |
| 4,133,766 | 1/1979 | Adie | 210/293 X |
| 4,152,265 | 5/1979 | Meyers | |
| 4,190,988 | 3/1980 | Carreiro | 52/11 X |
| 4,331,542 | 5/1982 | Emrie | 210/293 X |
| 4,411,779 | 10/1983 | McConnell, III | |
| 4,454,034 | 6/1984 | Astrom et al. | |
| 4,540,487 | 9/1985 | Johnson et al. | |
| 4,818,414 | 4/1989 | Ross | |
| 4,885,083 | 12/1989 | Banks | |
| 4,949,514 | 8/1990 | Weller | 52/12 |
| 5,089,117 | 2/1992 | Nichols | |
| 5,234,600 | 8/1993 | Kupke | |
| 5,454,663 | 10/1995 | Stegmeier | 52/169.5 X |
| 5,466,092 | 11/1995 | Semenza et al. | 405/45 |
| 5,527,456 | 6/1996 | Jensen | |
| 5,639,384 | 6/1997 | Brown et al. | 210/293 X |
| 5,803,662 | 9/1998 | Gunter | 405/119 |
| 5,810,513 | 9/1998 | Beamer et al. | 405/119 |
| 5,848,857 | 12/1998 | Kilworth et al. | 405/118 |

Primary Examiner—Eileen Dunn Lillis
Assistant Examiner—Jong-Suk Lee
Attorney, Agent, or Firm—Fulbright & Jaworski L.L.P.

[57] ABSTRACT

An improved method for constructing filter underdrain systems may be provided which uses prefabricated underdrain cells. The prefabricated underdrain cells may have a one piece construction having side walls and a bottom. The side walls may include a porous plate support ledge with a ridge at the center of the ledge. The ridge helps ensure that the sealant forms a uniform and effective gasket when the porous plates are installed.

8 Claims, 6 Drawing Sheets

FILTER UNDERDRAIN WITH PREFABRICATED CELLS

BACKGROUND OF THE INVENTION

1. Field of the Invention

The present invention relates to filter systems. This invention is directed toward an improved underdrain system that may be used in granular filtration media systems. More particularly, the improvement is a pre-fabricated cell system that allows direct installment of an underdrain of a filter.

2. Discussion of the Related Technology

Traveling bridge filter systems are well known in the field of waste water management. These systems are exemplified in U.S. Pat. No. 3,239,061, U.S. Pat. No. 4,152,265, and Assignee's U.S. Pat. No. 5,234,600 the disclosures of which are expressly incorporated by reference herein. The success of such filters depends to a large extent on the filter system's ability to backwash small, individual sections (often referred to as cells) of granular filtration media with water to periodically clean the filtration media. This backwash water is the waste by-product of filtering. Conventional filter systems backwash the entire filter area, thus requiring large flow rates and large volumes of backwash water. By minimizing the area of the filtration media to be cleansed using a cell structure, the amount of waste by-product, which is directly proportional to the area of the filtration media being cleansed, is also minimized. Sand is, commonly, used as a filtration media.

Conventionally, the construction of individual cells for containing a limited amount of filtration media uses fiberglass-reinforced polyester (FRP) sheets as cell dividers, plastic end sections, FRP support angles (either integral to cell dividers or attached separately), FRP holddown angles, porous media support plates, adhesive/sealant, a variety of hardware types, and leveling channels. This equipment is used to construct individual cells that are substantially hydraulically separated from other cells. In the present art, the cell dividers are used to:

(1) divide the filtration media into individual compartments;

(2) form the sidewalls of the plenum compartments; and (3) support the porous plates.

This multiple utility requires that great care be taken to avoid installation errors so that all the required purposes are properly met.

The installation of prior filters requires many steps and hardware; some steps require the presence of a technician. Initially, the concrete bottom of a filter tank is constructed, usually by a contractor. After the bottom of the filter tank (also called the "slab") is constructed, the slab is cleared, and multiple cell dividers and cell end sections are installed in the tank. Conventional cell installation requires the steps of:

(1) marking the locations of leveling strips, drilling holes, and placing anchor bolts in the filter tank bottom to support ends of leveling strips;

(2) installing leveling strips in order to provide a level base for the cell dividers;

(3) compensating for any irregularities in the base slab by using a surveyor's level, placing shims under the anchor bolts and at a midpoint between the anchor bolts, leveling all of the leveling strips to within $\frac{1}{16}$th of an inch;

(4) creating a multitude of individual compartments within the tank by mounting cell dividers on the leveling strips using an attachment angle and attaching cell end sections on both ends of the cell using stainless steel hardware;

(5) installing filtrate spools at the outlet end of the cells; and (6) filling the compartments formed by the cell dividers with grout up to the level of the invert of the filtrate spool.

Also, the top surface of the grout is sloped to encourage filtrate to drain downwards toward the cell outlets.

At this point, the concrete equipment returns to the site and is used to build the forms for making the concrete walls of the filter tank. The end sections, and only the end sections, of the cells must be cast into the walls of the tank, which makes building the forms for the walls quite difficult. After the concrete tank is completed, the contractor arranges porous media support plates in the cells. The steps involved include:

(1) installing porous media support plates at the top of the plenum compartment by first placing a generous amount of sealant/adhesive on a support angle along the entire periphery of the cell;

(2) placing the support plates on the support angle, being careful to space the plates end to end;

(3) placing a generous amount of sealant/adhesive on the top of the porous media support plate along the entire periphery of the cell; and (4) placing a holddown angle in position and attaching it with stainless steel hardware. Installing the plates involves applying sealant, which must be installed between a temperature range of 40 F. to 95 F. under varying weather conditions, which affects the viscosity of the sealant and makes it difficult to obtain consistent results from job to job.

After installing the porous plates, a "light test" is performed. This test must be performed when the sun is down, preferably at the darkest time of the night. During the test, a bright light is inserted into the plenum under the porous plates. As the light is withdrawn from a cell, an observer on the top side of the porous plates watches for any light to shine through, which indicates a leak that filtration media could pass through. The light spots, which commonly occur even with careful workmanship, must be repaired by topically applying additional sealant/adhesive. Finally, filtration media may be placed in the cell compartments to complete the construction of the filter's underdrain.

This method of construction has numerous drawbacks. Portions of the underdrain must be installed after the concrete filter tank structure (although steel or other tank materials may be used) is begun, but not before it is finished. This involves considerable expense in mobilizing equipment on the site, demobilizing, and then remobilizing. The normal construction sequence typically occurs over a period of several months. Also, due to complexity of installation, the manufacturers of the parts of such filter systems are typically required to provide up to three weeks supervision during installation.

Another drawback is that the sealant requires considerable care in its application, as it is widely recognized that sealant problems are a leading cause of failure in waste water filter systems. Although sealing of the plates is critical to proper performance, it is frequently performed by unskilled workers unfamiliar with the equipment, and manufacturer supervision is seldom available for the entire duration of the installation.

The large amount of hardware required for cell assembly also contributes to improper construction of the underdrain.

Additionally, grout between cells is problematic in that grout must be applied in narrow spaces, at a slope, and is difficult to clean up.

Should problems develop after start-up, disassembly and repair is extremely difficult. The use of sealant/adhesive during installation results in a large percent of breakage of the components when attempting to disassemble the filter.

This invention solves what has historically been perhaps the number one problem with such equipment: media leaks resulting from poor installation of the underdrain and porous plates.

This invention provides a integral plenum module that may be factory assembled and installed directly to a filter slab. This elimates the need for a technician to be on site during the construction of the plenum section of the filter.

This invention also elimates the need for installing leveling strips in order to provide a level base for the cell dividers.

SUMMARY OF THE INVENTION

The present invention provides an improved construction system of the underdrain for filter systems. The prefabricated underdrain cells may have a one piece construction having side walls (120) and a bottom (110). The side walls may include a porous plate support ledge with a ridge at the center of the ledge. The ridge helps ensure that the sealant forms a uniform and effective gasket when the porous plates are installed. Additionally, this feature creates a labyrinth seal that further minimizes the likelihood of media leaks.

Another advantage of the prefabricated cell is that it can be constructed of either fiberglass-reinforced polyester (FRP) or stainless steel.

Another advantage of the porous plate is that it can be constructed of either fused aluminum oxide (FAO) or polyethylene.

Another advantage of the polyethylene porous plates is that they are light in weight, and more tolerant of shock loads.

Another advantage is that underdrain cells may be factory assembled, resulting in higher production rates, and more uniform, higher quality workmanship than can be obtained in the field.

Another advantage is that underdrain cells reduce of media leaks resulting from poor installation of the underdrain and porous plates.

Another method for constructing a filter underdrain may be provided comprising the steps of installing at least one bracket to a filter slab and installing a cell assembly against said at least one bracket.

Another method for constructing a filter may be provided comprising the steps of constructing a slab of a filter tank, installing a filtrate outlet section on the slab, installing at least one angle stop to a filter slab, installing a modular plenum assembly against said at least one angle stop and constructing walls of the filter tank, wherein the filtrate outlet section is embedded within an effluent wall.

A plenum module may be provided with a housing having a bottom, side walls, end caps and a top opening. In addition, the module may have a porous plate covering said top opening. The plenum module housing may also have a ledge with a center ridge which supports the porous plate. The porous plate may be connected to the housing by an adhesive.

DETAILED DESCRIPTION OF THE PREFERRED EMBODIMENT

Figure 1:
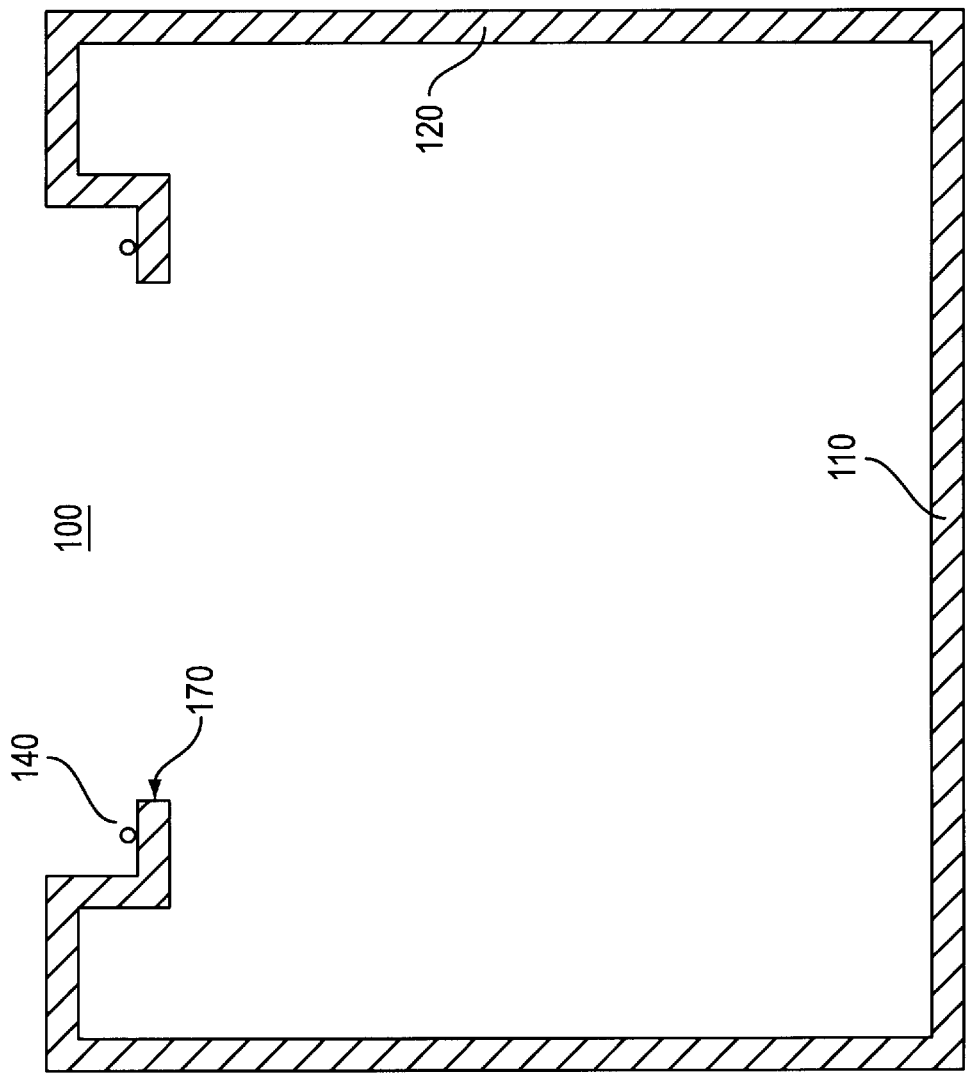
FIG. 1 is a cross-section view of underdrain cell.
Figure 2:
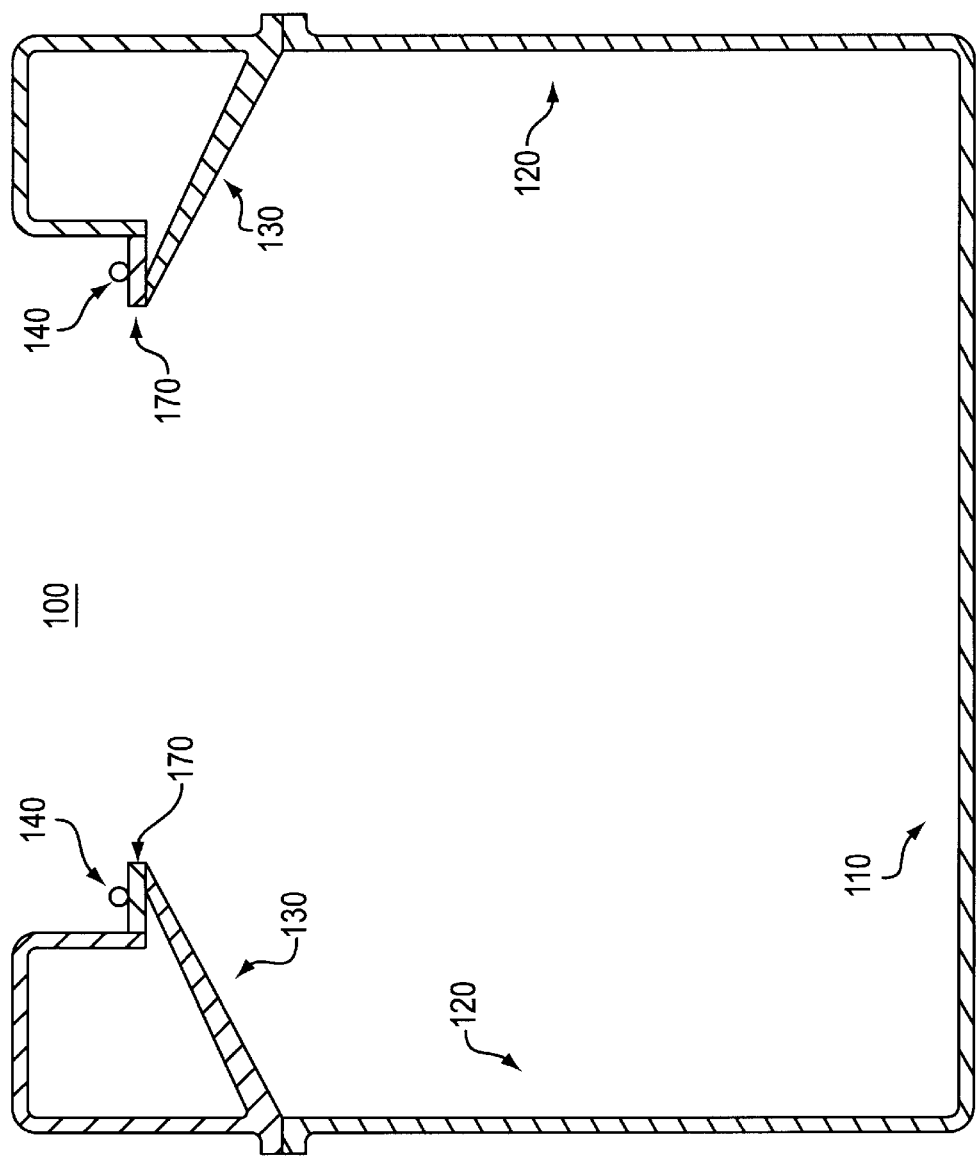
FIG. 2 is a cross-section view of underdrain cell for another embodiment.

FIGS. 1 and 2 illustrates a cross-section of the proposed cell (100). The cell can be a one-piece construction having side walls (120) and a bottom (110). The side walls may include a porous plate support ledge (170) with ridge (140) at the center of the ledge. The ridge ensures that when a sealant is applied to the ledge for installing the porous plates, a uniform and effective gasket is formed. Additionally, this feature creates a seal that further minimizes the likelihood of media leaks. In a preferred embodiment, the cell may be constructed of stainless steel, as shown in FIG. 1. Another preferred embodiment is shown in FIG. 2, where the cell is made from fiberglass-reinforced polyester (FRP) material. The FRP option provides an additional bar (130) for supporting the porous plates.

Figure 3:
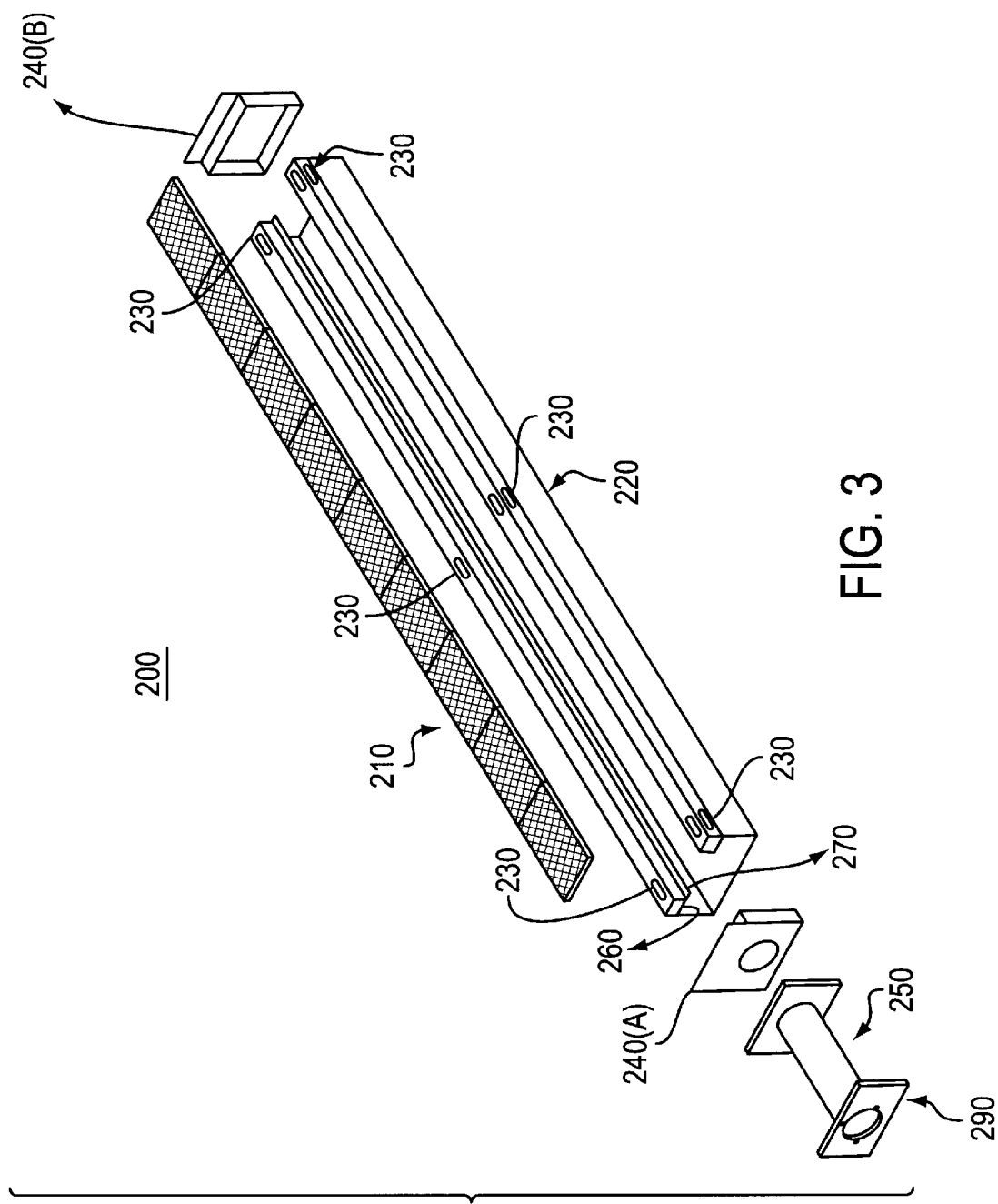
FIG. 3 is an perspective view of underdrain cell.

FIG. 3 shows an embodiment for the assembly of the underdrain cell using fiberglass (200). The modular plenum assembly 200 has a bottom surface with two side walls 220. The side walls may have a ledge (170, 270). In addition, the side walls 220 may be equipped with hand grips (230) to assist in moving the modular plenum. The modular has end caps (240A, 240B). On the outlet end, the plate (240A) has a hole in it to receive the filtrate spool (250,290). A sealant or adhesive may be applied to the porous plate support ledge (170,270) prior to installing the porous plate 210. The porous plates may be made of a variety of materials (e.g., fused aluminum oxide (FAO), polyethylene, etc.). The geometry of the structure may be varied to alter the width of the porous plate. The plates need not correspond precisely to the cell width particularly if adapters or nozzles are used. The preferred stainless steel version is similar, except that the end caps are replaced by a flat plate tack welded to the ends of the cell.

Figure 4:
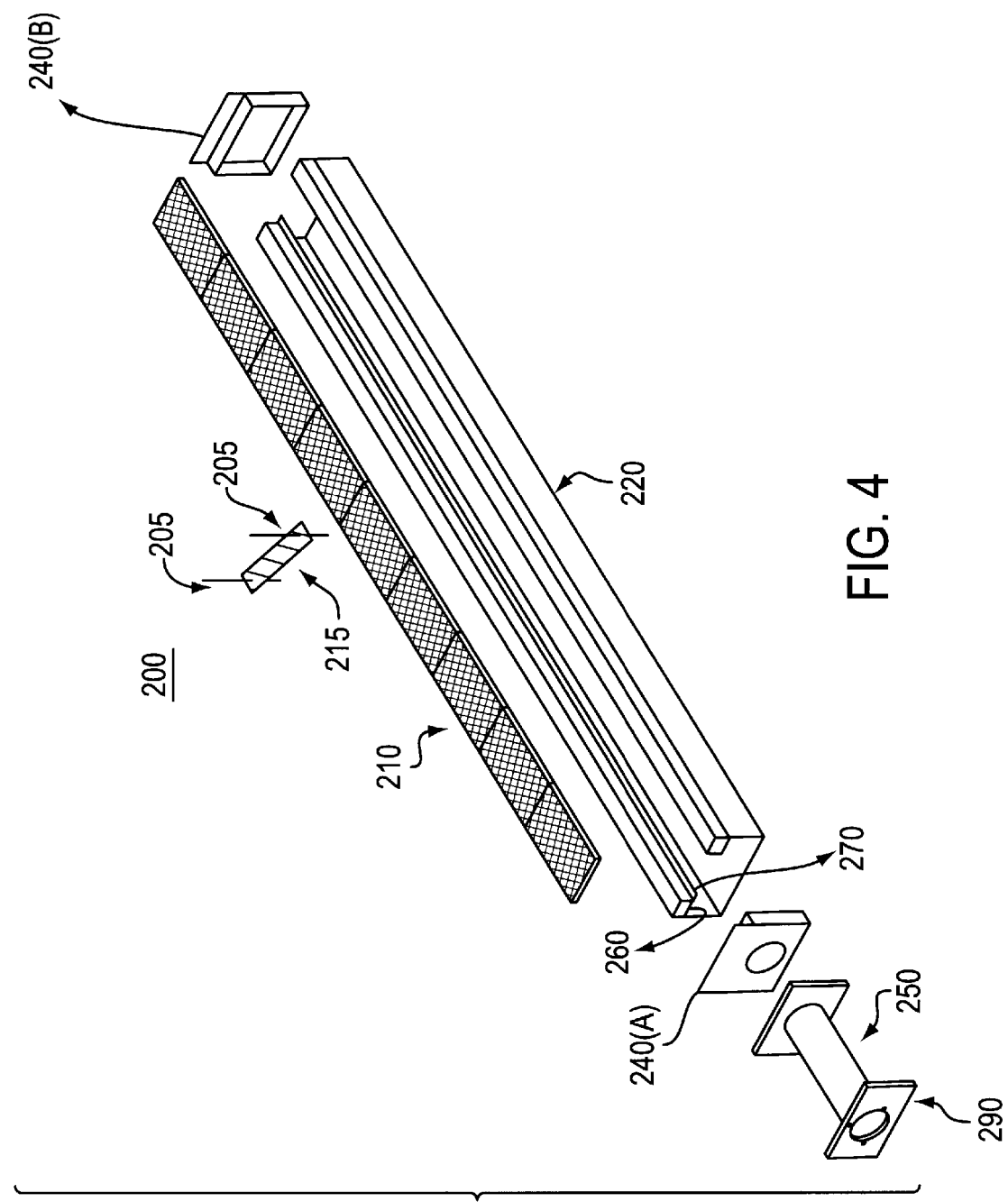
FIG. 4 is an perspective view of underdrain cell for another embodiment.

In FIG. 4, shows another preferred embodiment of the cell. In this embodiment, the porous plate may have an additional securing means (205,215). The securing means may be a hold down strap that is attached by screws or bolts at the porous plate joints.

Figure 5:
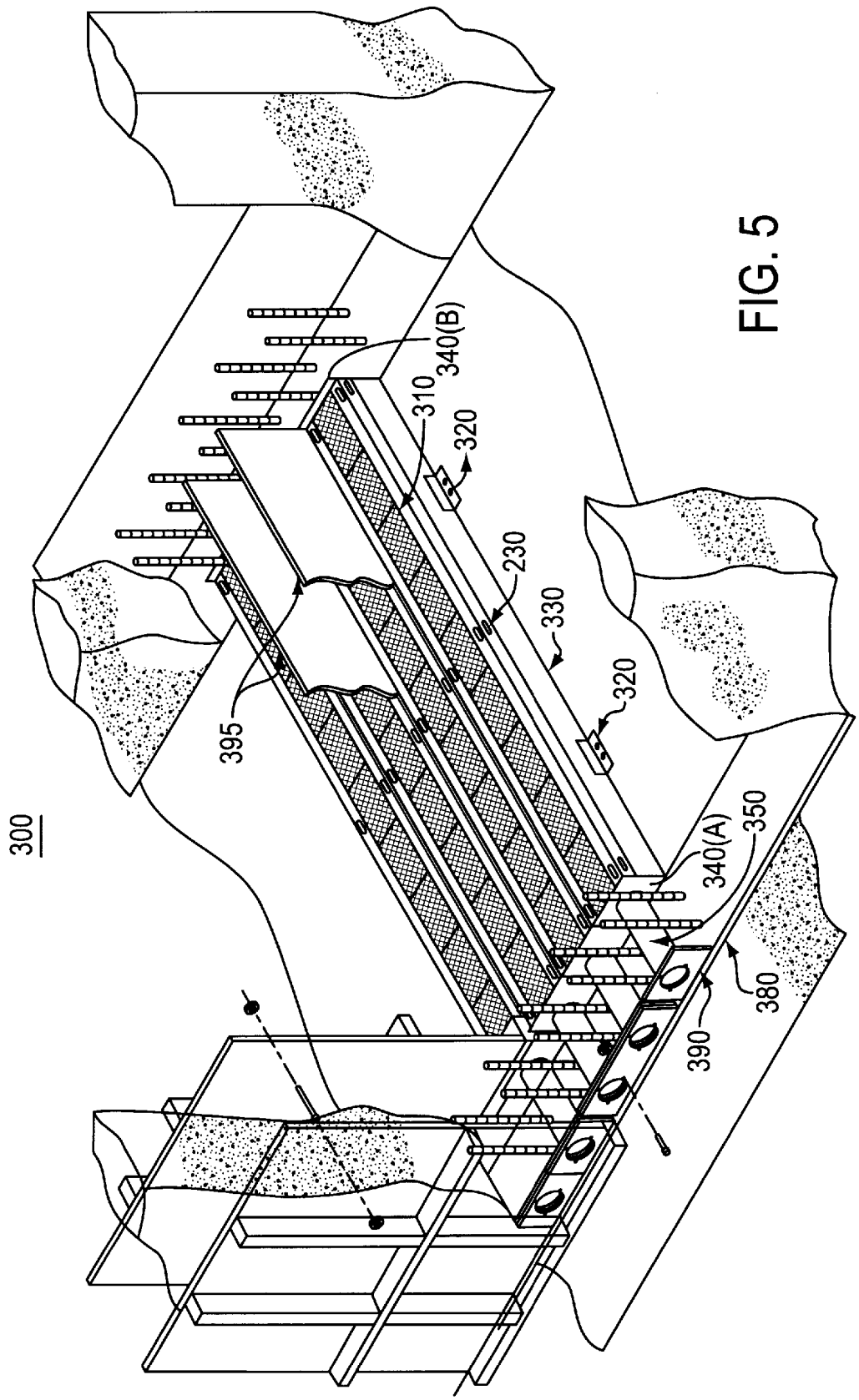
FIG. 5 is a perspective view of improved underdrain system.

FIG. 5 shows a perspective view of the improved underdrain system (300). The modular plenum assembly (310) installation steps may be as follows:

(1) marking the location of the first cell (330) (e.g., chalk lines) and installing angle stops on the mark approximately 2 feet in from each end of the cell (320);

(2) marking a chalk line located ¾" inside what will be the face of the effluent (outlet) wall (340);

(3) placing the first cell in position along the chalk line (330) and firmly up against the angle stops (320);

(4) placing the next cell in position firmly up against the previous cell, with the filtrate spool flange (390) aligned with the chalkline (340). Shims may be used to keep the module tops approximately aligned;

(5) repeating step 4 until the other end of the filter is reached;

(6) installing wearstrip (380).

At this point, the contractor may set his forms and pour the concrete walls in the normal manner, the underdrain is complete. Note that the only hardware required is for attaching the wearstrip and angle stops. More importantly, no grouting is required. This is a significant reduction in labor, which, in the case of grouting, may be onerous.

Figure 6:
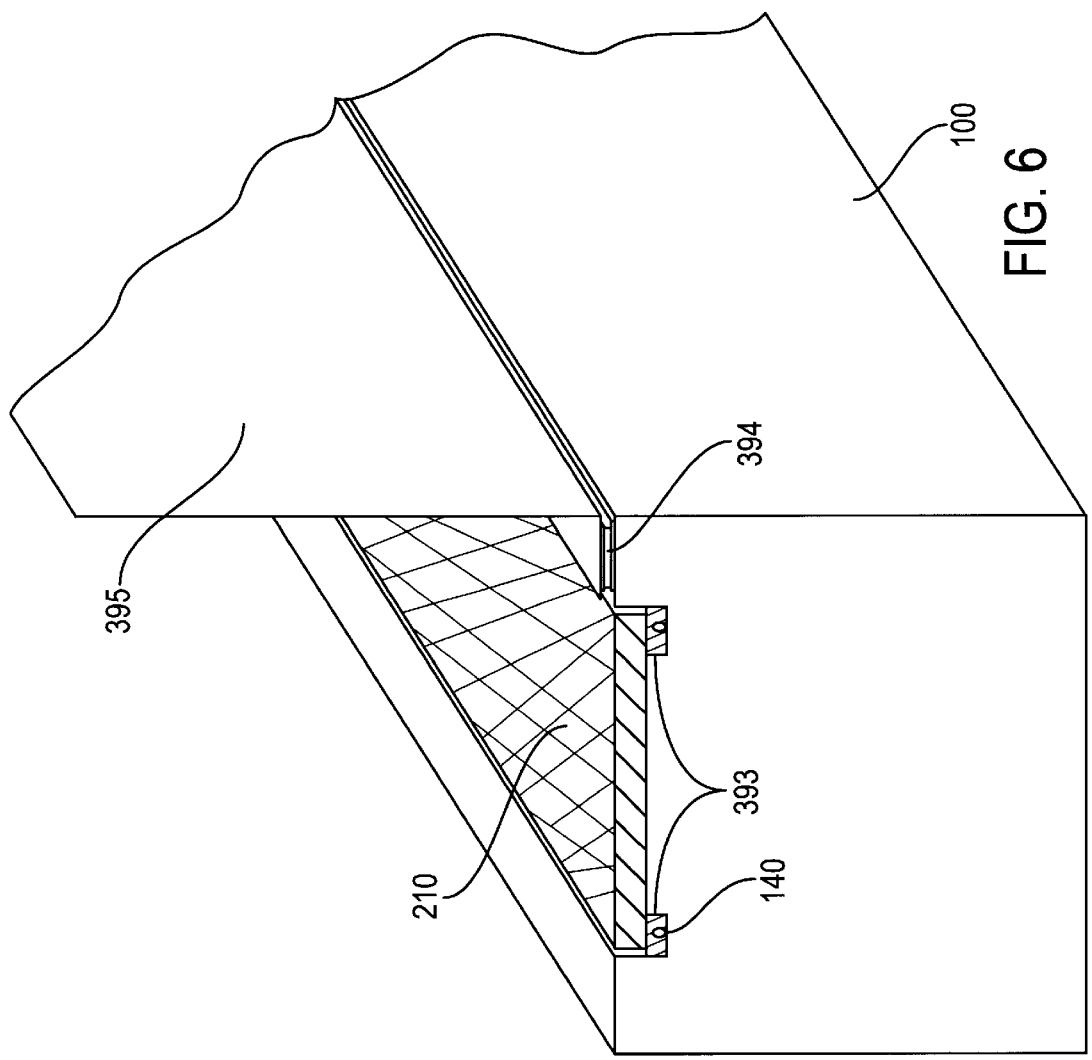
FIG. 6 is an cut away view of underdrain cell.

After the walls are poured, the dividers (395) are installed. The dividers may be installed with a double sided tape, as shown in FIG. 6. In the fiberglass version, a stop could be used to space the cells and provide a space for a drop-in divider. In the stainless steel version, the divider may have a leg at the bottom that will sit on the cell and be attached with hardware. The net effect of this system is a simpler, less costly, and more reliable installation. Installation of the media and backwash mechanism are unaffected by the underdrain system.

We claim:

1. A method for constructing a filter underdrain comprising the steps of:

installing at least one angle stop to a filter slab of a filter tank;

providing a modular plenum assembly, which extends substantially the entire length of the filter tank, having a bottom, side walls, and a top opening with a porous plate covering said top opening; and installing said modular plenum assembly against said at least one angle stop.

2. A method of constructing a filter underdrain, according to claim 1, further comprising the step of:

connecting said modular plenum assembly to a filtrate outlet section.

3. A method of constructing a filter underdrain, according to claim 2, further comprising the step of:

installing dividers after the step of constructing the walls of the filter tank.

4. A method for constructing a filter underdrain comprising the steps of:

installing at least one bracket to a filter slab of a filter tank; and installing a cell assembly having a bottom, side walls, and a top opening with a porous plate covering said top opening, which extends substantially the entire length of the filter tank, against said at least one bracket.

5. A method for constructing a filter underdrain comprising the steps of:

constructing a slab of a filter tank;

installing a filtrate outlet section on the slab;

installing at least one angle stop to the slab;

installing a modular plenum assembly having a bottom, side walls, and a top opening with a porous plate covering said top opening, which extends substantially the entire length of the filter tank, against said at least one angle stop; and constructing walls of the filter tank, wherein the filtrate outlet section is embedded within an effluent wall.

6. A plenum module for a filter underdrain comprising:

a housing having a bottom, side walls, end caps and a top opening; and a porous plate covering said top opening wherein the plenum module extends substantially the entire length of a filter tank.

7. A plenum module, according to claim 6, further comprising the housing supporting the porous plate wherein the housing has a ledge with a center ridge.

8. A plenum module, according to claim 6, wherein the porous plate is adhesively connected to the housing.

* * * * *